United States Patent
Peloux et al.

(10) Patent No.: US 11,226,499 B2
(45) Date of Patent: Jan. 18, 2022

(54) PLATEAU-BASED CONTROL OF THE TRANSMISSION OF A VARIABLE TRANSMISSION LENS

(71) Applicant: Essilor International, Charenton le Pont (FR)

(72) Inventors: Marius Peloux, Charenton le Pont (FR); Cedric Gilbert, Charenton le Pont (FR); Samuel Archambeau, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 116 days.

(21) Appl. No.: 15/743,166

(22) PCT Filed: Jul. 7, 2016

(86) PCT No.: PCT/FR2016/051719
§ 371 (c)(1),
(2) Date: Jan. 9, 2018

(87) PCT Pub. No.: WO2017/009544
PCT Pub. Date: Jan. 19, 2017

(65) Prior Publication Data
US 2018/0210236 A1    Jul. 26, 2018

(30) Foreign Application Priority Data
Jul. 10, 2015  (FR) ...................... 15 56623

(51) Int. Cl.
*G02C 11/00*    (2006.01)
*G02F 1/163*    (2006.01)
(Continued)

(52) U.S. Cl.
CPC .............. *G02C 11/10* (2013.01); *G02C 7/101* (2013.01); *G02F 1/13318* (2013.01);
(Continued)

(58) Field of Classification Search
CPC ....... G02C 11/10; G02C 7/0101; G02F 1/101; G02F 1/10; G02F 1/163; G02F 1/133;
(Continued)

(56) References Cited

U.S. PATENT DOCUMENTS 5,671,035 A    9/1997    Barnes
5,841,507 A    11/1998    Barnes
(Continued)

FOREIGN PATENT DOCUMENTS

WO    2008/078320 A2    7/2008
WO    WO 2014/087448 A1    6/2014

OTHER PUBLICATIONS

International Search Report dated Sep. 30, 2016 in PCT/FR2016/051719 filed Jul. 7, 2016.
(Continued)

*Primary Examiner* — Marin Pichler
(74) *Attorney, Agent, or Firm* — Oblon, McClelland, Maier & Neustadt, L.L.P.

(57) ABSTRACT

The invention relates to a variable transmittance device including at least one variable transmittance lens and a control circuit comprising at least one sensor suitable for measuring an illuminance (E), the control circuit being suitable for automatically controlling the value of the transmittance of the variable transmittance lens depending on the illuminance (E) measured by the sensor, wherein the control circuit defines a plurality of successive illuminance ranges (P) each illuminance range (P) being bounded by a minimum illuminance value (Emin) and a maximum illuminance value (Emax), and wherein the control circuit is suitable for controlling the transmittance of the lens to a plurality of setpoint transmittance values (Tv) respectively corresponding to said plurality of illuminance ranges (P).

15 Claims, 3 Drawing Sheets

(51) Int. Cl.
    *G02C 7/10*     (2006.01)
    *G02F 1/133*     (2006.01)

(52) U.S. Cl.
    CPC .......... *G02F 1/163* (2013.01); *G02F 1/13312* (2021.01); *G02F 2201/58* (2013.01); *G02F 2203/48* (2013.01)

(58) Field of Classification Search
    CPC ............. G02F 1/13306; G02F 1/13318; G02F 2001/13312; G02F 2201/58; G02F 2203/01; G02F 2203/48
    USPC ............................................. 351/44; 359/604
    See application file for complete search history.

(56) References Cited

U.S. PATENT DOCUMENTS

| | | |
|---|---|---|
| 2002/0154379 A1 | 10/2002 | Tonar et al. |
| 2004/0160657 A1 | 8/2004 | Tonar et al. |
| 2006/0203323 A1 | 9/2006 | Tonar et al. |
| 2008/0297879 A1 | 12/2008 | Tonar et al. |
| 2013/0048836 A1 | 2/2013 | Burt et al. |
| 2013/0278989 A1* | 10/2013 | Lam ........................... B60J 3/04 359/275 |
| 2014/0020147 A1 | 1/2014 | Anderson et al. |
| 2015/0346517 A1* | 12/2015 | Iigahama ................. G02C 7/12 349/13 |

OTHER PUBLICATIONS

Maxim, "MAX44009 Industry's Lowest-Power Ambient Light Sensor with ADC," Maxim Integrated, Apr. 2013, XP002756437, retrieved from: https://web.archive.org/web/20130416052733/http://datasheets.maximintegrated.com/en/ds/MAX44009.pdf on Apr. 13, 2016, pp. 1-20.

Office Action dated Aug. 20, 2020 in corresponding Japan Patent Application No. 2018-520031 with English Translation.

Office Action dated May 10, 2021 in corresponding Japanese Patent Application No. 2018-520031 (with English Translation), 10 pages.

* cited by examiner

| $T_v$ | $[E_{min}\ E_{max}]$ | $[E_{min}\ E_{max}]_{hyst}$ | $\Delta t$ |
|---|---|---|---|
| 0.9 | [0 2000] | [0 2500] | |
| 0.55 | [2000 6000] | [1600 7500] | 1.6 |
| 0.25 | [6000 20000] | [4800 25000] | |
| 0.1 | [20000 -] | [16000 -] | |

PLATEAU-BASED CONTROL OF THE TRANSMISSION OF A VARIABLE TRANSMISSION LENS

The invention relates to plateau-based control of the transmittance of a variable-transmittance lens intended, for example, to be used in wearable systems such as smart-glasses. The invention more particularly relates to a variable-transmittance device and to a method for controlling the transmittance of a variable-transmittance lens of such a device.

Devices are known that comprise variable-transmittance lenses the transmittance of which may vary automatically depending on the ambient light to which the wearer is exposed. The variable-transmittance lens is then electrically connected to a control circuit that, since a battery or a system for harvesting energy is provided, is stand-alone from the point of view of power supply, this circuit comprising a sensor suitable for measuring a light level and being suitable for automatically setting the transmittance value of the variable-transmittance lens depending on the light level measured by the sensor.

However, the electrical power consumption of the control circuit on the one hand and the electrical power consumption of the variable-transmittance lenses on the other may prove to be too high, it then being necessary to frequently recharge the battery that supplies the electronic components of the device with power. This may prove to be particularly inconvenient for the wearer of the device.

The invention aims to at least partially solve the aforementioned drawbacks and, more particularly, aims to control the transmittance of the lens depending on the light level measured by a sensor while ensuring the wearer remains visually comfortable and while minimizing the electrical power consumption of the device.

Thus, the invention relates to a variable-transmittance device including at least one variable-transmittance lens and one control circuit comprising at least one sensor suitable for measuring a light level, said control circuit being suitable for automatically setting the transmittance value of the variable-transmittance lens depending on the light level measured by the sensor, wherein the control circuit defines a plurality of successive light-level plateaus, each light-level plateau being bounded by a minimum light-level value and a maximum light-level value, the control circuit being suitable for setting the transmittance of the lens to a plurality of setpoint values corresponding to said plurality of light-level plateaus, respectively.

Thus, it is possible to make light-level plateaus of the sensor coincide with transmittance setpoint values of the lens in order to minimize the electrical power consumption of the device.

According to one embodiment, the control circuit defines at least three successive light-level plateaus, the control circuit being suitable for setting the transmittance of the lens to at least three setpoint values corresponding to said three light-level plateaus, respectively.

According to one embodiment, the sensor is suitable for measuring the light level periodically, the measurement period of the sensor being comprised between 5 milliseconds and 1 second.

According to one embodiment, the variation between two successive transmittance setpoint values of the lens is comprised between 0.05 and 0.6.

According to one embodiment, the device comprises an adjusting mechanism suitable for allowing a wearer of the device to modify the transmittance setpoint values and/or the minimum values and/or the maximum values of the light-level plateaus.

According to one embodiment, each of the transmittance setpoint values of the lens is comprised in one of the following intervals:
between 0.80 and 1;
between 0.43 and 0.80;
between 0.18 and 0.43; and
between 0.08 and 0.18.

According to one embodiment, the transmittance setpoint values of the lens are comprised in different intervals, respectively.

According to one embodiment, the control circuit comprises a memory for storing minimum and maximum light-level values of the light-level plateaus.

The invention also relates to a method for controlling the transmittance of a variable-transmittance lens of a variable-transmittance device comprising a control circuit including at least one sensor suitable for measuring a light level, the control circuit being suitable for automatically setting the transmittance value of the variable-transmittance lens depending on the light level measured by the sensor, the method including the steps, implemented by the control circuit, of: defining a plurality of successive light-level plateaus, each light-level plateau being bounded by a minimum light-level value and a maximum light-level value, and, depending on the current light level measured by the sensor, setting the transmittance of the lens to one transmittance setpoint value from at least a plurality of transmittance setpoint values corresponding to said plurality of light-level plateaus, respectively.

According to one embodiment, the method furthermore comprises steps in which: the sensor stores in memory at least the minimum light-level value and the maximum light-level value of a current plateau corresponding to a current transmittance of the variable-transmittance lens, and the control circuit acts on a current light-level value measured by the sensor only once the sensor has measured a current light-level value lower than the minimum light-level value or higher than the maximum light-level value of the current plateau for a length of time longer than a triggering time.

According to one embodiment, after the current light-level value measured by the sensor has been received, the control circuit determines a new current plateau in which the measured light-level value is located, and automatically sets the transmittance of the lens to the setpoint value corresponding to the new current plateau.

According to one embodiment, the control circuit furthermore stores, for each plateau, a secondary minimum value and a secondary maximum value, the secondary maximum value of a given plateau substantially corresponding to the secondary minimum value of a following plateau, the minimum value of a current plateau, stored by the sensor, being lower than or equal to the secondary minimum value of this current plateau, and the maximum value of a current plateau, stored by the sensor, being higher than or equal to the secondary maximum value of this current plateau, after the current light-level value measured by the sensor has been received, the control circuit determines a new current plateau in which the measured light-level value is comprised between the secondary minimum value of this plateau and its secondary maximum value and automatically sets the transmittance of the lens to the setpoint value corresponding to the new current plateau.

According to one embodiment, after a new transmittance setpoint value of the lens corresponding to a new current plateau has been applied, the control circuit transmits to the sensor the minimum light-level value and the maximum light-level value of the new current plateau, for storage in the memory of the sensor.

According to one embodiment, the light level-dependent transmittance setpoint values of the lens are obtained via transmittance values of a photochromic lens.

According to one embodiment, the triggering time of the sensor is comprised between 1 second and 2 seconds.

The invention also relates to an ophthalmic system comprising at least one variable-transmittance device according to the invention.

The invention will now be described with reference to the drawings, in which.

It should be noted that, in the figures, structural and/or functional elements common to the various embodiments may have the same references. Thus, unless otherwise mentioned, such elements have identical structural, dimensional and material properties.

For the sake of clarity, only the elements useful for understanding the embodiments described have been represented and will be described in detail.

Figure 1:
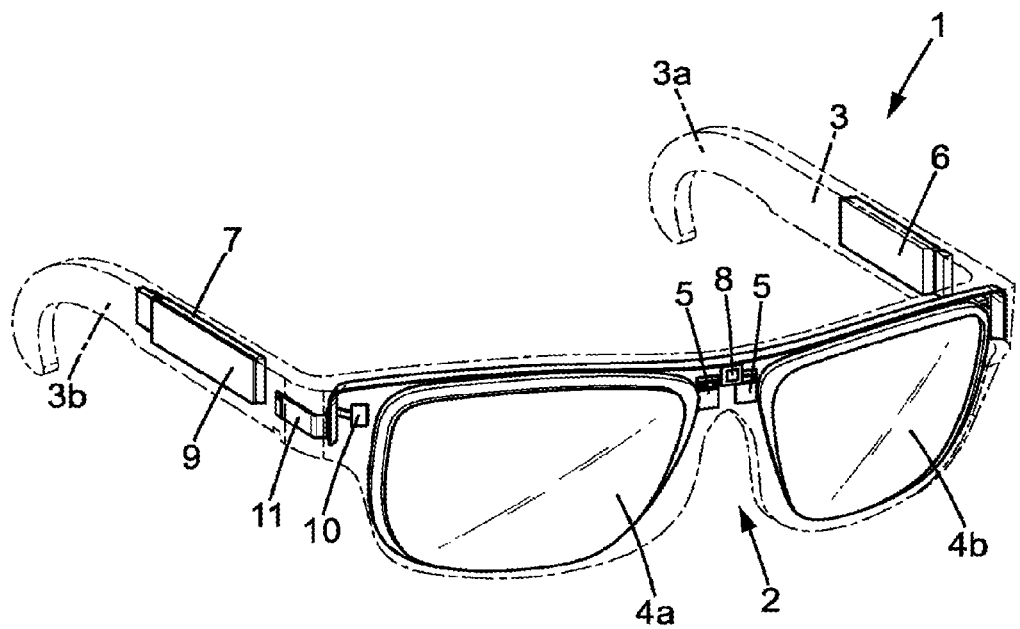
FIG. 1 is a schematic representation of one example embodiment of an ophthalmic system according to the invention.

FIG. 1 is a schematic view of a system 1 comprising a variable-transmittance device 2. In particular, as shown in FIG. 1, the system 1 comprises a frame 3, in particular having two temples 3a, 3b. In the embodiment in FIG. 1, the device 2 comprises two variable-transmittance lenses 4a, 4b that are mounted in the frame 3.

According to one embodiment, the system 1 is an ophthalmic system, and the variable-transmittance lenses 4a, 4b are preferably ophthalmic lenses respecting an ophthalmic prescription of a wearer of the system 1.

According to one embodiment, an lens 4 is preferably an electrochromic lens. As is known per se, an electrochromic lens 4 has a structure including two transparent outer layers, for example two sheets of organic or mineral glass, on which electrically conductive coatings are deposited, on the inner faces thereof. An electrochromic composition fills a cavity formed between the two electrically conductive coatings. It is thus possible to make the value of the light transmittance of the lens vary via a redox reaction of the electrochromic composition by applying an electrical current to the electrically conductive coatings.

However, the invention is not limited to electrochromic lenses and may also relate to other types of variable-transmittance lenses, such as liquid-crystal (liquid-crystal display (LCD)) lenses for example.

The lens 4 is suitable for transmittance-plateau-based operation. More precisely, the transmittance of the lens 4 may be set to a plurality of setpoint values Tv, which values are advantageously discrete. Given that an electrochromic lens 4 in particular consumes more power when the transmittance of the lens is varied, such a transmittance-plateau-based operation in particular allows the electrical power consumption of the device 2 to be minimized.

Below, the transmittance of the lens 4 is given in percent, 1 or 100% corresponding to the maximum transmittance that the lens 4 may have, and 0 or 0% to the state in which the lens 4 has a transmittance of zero. The definition of the transmittance of the lens 4 is in particular given by the formula below, where $SD65(\lambda)$ is the spectral distribution of illuminant D65, $T(\lambda)$ is the spectral transmittance curve of the lens and $V(\lambda)$ is the relative spectral luminous efficiency curve of the human eye:

$$\tau_v = \frac{\int S_{D65}(\lambda) V(\lambda) T(\lambda) d\lambda}{\int S_{D65}(\lambda) V(\lambda) d\lambda}$$

The device 2 also comprises at least one control circuit 5 that is connected, in particular electrically, to the lens 4. In the embodiment shown in FIG. 1, in which the system 1 comprises two variable-transmittance lenses 4a, 4b, the device 2 comprises one control circuit 5a, 5b for each lens 4a, 4b.

The control circuit 5 and the lens 4 are also connected to an electrical power source, in particular to a battery 6, for example mounted in a temple 3a of the frame 3 as shown in FIG. 1.

In the embodiment shown in FIG. 1, in which the system 1 comprises two variable-transmittance lenses 4a, 4b, the device 2 may furthermore comprise a control element 7, for example a motherboard, that implements the control routine and transmits the transmittance setpoint values Tv of the two lenses 4a, 4b of the system 1. The control element 7 in addition allows the weight of the battery to be balanced since it is positioned on a different temple to the battery 6.

The control circuit 5 comprises at least one light sensor 8. As a variant, the sensor 8 may be an element that is separate from the control circuit 5. The sensor 8 is suitable for measuring the ambient light level E reaching the device 2. By "ambient", what is meant is the light level to which the device 2 is exposed. The ambient light level therefore varies depending on conditions exterior to the device 2, such as metrological conditions when the device 2 is located outside, or how well a room is lit when the device 2 is located inside for example.

The sensor 8 is more particularly integrated into the frame 3 of the system 1, in particular into the nose bridge of the frame 3 as shown in FIG. 1. According to one embodiment, the sensor 8 is placed set back in the frame 2, in particular for reasons of mechanical stresses and of protection of the sensor 8 from bad weather. However, in this embodiment, the sensor 8 does not necessarily measure all the light reaching the device 2 because of its set-back position. It is then possible to correct the light-level values E measured by the sensor 8 by calibration in order to compensate for the set-back position of the sensor 8. Setting back this sensor 8 may allow the field seen by the sensor 8 to be limited, for example in order to bring it closer to the visual field perceived by a standard wearer of the device 2.

The sensor 8 may also be associated with an optical element, such as a filter or an optical diffuser placed facing the sensor 8, or indeed a convergent or divergent lens.

The sensor 8 is preferably a micro light sensor (also called an ambient light sensor—ALS). More precisely, a sensor 8 used according to the invention may for example be sold under the name Maxim MAX44009 by Maxim Integrated®. The sensor 8 may thus measure the light level received per unit area (in lux or in $W.m^{-2}$). As a variant, the sensor 8 may also measure other light-level values, such as an intensity or a photometric or visual luminance. The sensor 8 may for example measure the light level in the visible and/or in the ultraviolet.

In order to ensure the reliability of the measurement of the light level E, the device 2 may furthermore comprise a plurality of sensors 8, in particular two sensors 8. In the case where the sensors 8 measure different light-level values E, the control circuit 5 then for example takes into account only the highest measured light-level value E or the value of the sensor 8 that measures no variation in light level. Thus, even if a sensor 8 malfunctions or if a measurement is not exploitable (in case of a lock of hair in front of the sensor 8 for example), the other sensor 8 may deliver an exploitable measurement of light level E.

The sensor 8 according to the invention operates in a plateau-based light-level detection mode. To this end, the sensor 8 comprises a storage memory. The sensor 8 stores in memory at least one minimum light-level value $Emin,hyst$ and one maximum light-level value $Emax,hyst$. These minimum and maximum light-level values $[Emin, Emax]hyst$ define therebetween a detection plateau. For the minimum value of the first plateau, i.e. the plateau corresponding to the lowest light-level values, it is possible not to store any value, this value then being 0 by default. For the maximum value of the last plateau, i.e. the plateau corresponding to the highest light-level values, it is likewise possible not to store any value, this value then being infinity by default.

Depending on the measured light level E and on the minimum and maximum values $[Emin, Emax]hyst$ of a detection plateau, the sensor 8 is suitable for alternatively switching to an inactive state or to an active state.

In the inactive state, the sensor 8 is on standby, and in particular has a minimum electrical power consumption. In the inactive state, the sensor 8, for example by virtue of an integrated processor, measures the ambient light level E. The sensor 8 in particular measures the ambient light level E periodically with a period Tmes. The period Tmes may be comprised between 0 and 1 seconds, or even between 100 milliseconds and 800 milliseconds. The period Tmes may also be equal to about 6.25 milliseconds.

The sensor 8 remains in the inactive state provided that the measured light level E is not lower than the minimum light-level value $Emin,hyst$ or higher than the maximum light-level value $Emax,hyst$ of the detection plateau for a length of time longer than a set triggering time $\Delta t$. The triggering time $\Delta t$ is preferably chosen to be comprised between 1 second and 2 seconds, or even between 0.1 second and 2 seconds. Preferably, the triggering time $\Delta t$ is preferably equal to 1.6 seconds. The triggering time $\Delta t$ is in particular chosen so as not to lead to too frequent a variation in the transmittance of the lens 4.

When the sensor 8 measures a current light-level value E lower than the minimum light-level value $Emin,hyst$ or higher than the maximum light-level value $Emax,hyst$ of the detection plateau for a length of time longer than the triggering time $\Delta t$, the sensor 8 passes from the inactive state to the active state. In the active state, the sensor 8 then transmits the current light-level value E, in particular the last measured light-level value E, to the control circuit 5.

According to one embodiment, the sensor 8 may determine and automatically make vary the measurement period Tmes and/or the triggering time $\Delta t$ in order to minimize its electrical power consumption.

The operation of the sensor 8 in a plateau-based detection mode allows the electrical power consumption of the device 2 to be minimized, given that the sensor 8 consumes more electrical power in the active state than in the inactive state, and in particular when it transmits a light-level value E to the control circuit 5, and in particular to the control element 7. Furthermore, operation of the sensor 8 in a plateau-based detection mode also makes it possible to prevent the control circuit 5 from having to continuously interrogate the sensor 8 in order to obtain the ambient light-level value E. As the control circuit 5 consumes more electrical power than the sensor 8, the overall power consumption of the device 2 would then be higher.

The control circuit 5 is suitable for setting the transmittance of the lens 4 to a setpoint value Tv depending on the light-level value E transmitted by the sensor 8. In particular, the control circuit 5 defines according to the invention a plurality of successive operational light-level plateaus P. In particular, with each operational plateau of the control circuit 5 is associated a detection plateau of the sensor 8. By "successive", what is meant is the maximum value Emax of an operational plateau P0 corresponds to the minimum value Emin of a following operational plateau P1, and in particular of a higher plateau. To this end, the control circuit 5 or the control element 7 comprises a storage memory. The control circuit 5 or the control element 7 stores in memory at least two minimum light-level values Emin and two maximum light-level values Emax, each pair of minimum and maximum light-level values defining therebetween an operational plateau. Each operational light-level plateau P corresponds to a transmittance setpoint value Tv of the lens 4.

What is meant here by transmittance setpoint value Tv is the values to be reached when the transmittance of the lens 4 is in a stable state; specifically, the transmittance value of the lens 4 may vary continuously during the transition between two stable states, for a limited length of time.

The control circuit 5 is thus suitable for controlling the passage of the transmittance of the lens 4 between two transmittance setpoint values Tv corresponding to two different operational plateaus. The variation between two successive transmittance setpoint values Tv of the lens 4 is preferably discontinuous.

According to one embodiment, the control circuit 5 defines at least three operational plateaus P, with which are associated three transmittance setpoint values of the lens Tv. However, the control circuit 5 may define more than three operational plateaus P, and in particular four operational plateaus P.

Generally, a device 2 including a higher number of operational plateaus P will consume more electrical power given that the variation in the transmittance of the lens 4 is liable to be more frequent. In contrast, a device 2 including a higher number of operational plateaus P allows a more rapid variation in the transmittance value of the lens 4 to be obtained given that the variation between two successive transmittance setpoint values Tv of the lens 4 is liable to be less large. The variation between two successive transmittance setpoint values of the lens 4 is in particular preferably comprised between 0.06 and 06, or even between 0.1 and 0.6.

The operational plateaus P and the transmittance setpoint values Tv of the lens 4 are more particularly chosen in order to make the variation in the transmittance of the lens 4 mimic a target function Tv,target=f(E).

According to one embodiment, the target function Tv,target corresponds to the transmittance values of a photochromic lens, and in particular of an instantaneous photochromic lens. By instantaneous photochromic lens what is in particular meant is a fictional lens that has the same transmittance properties as a photochromic lens but an immediate transmittance reaction.

Figure 2:
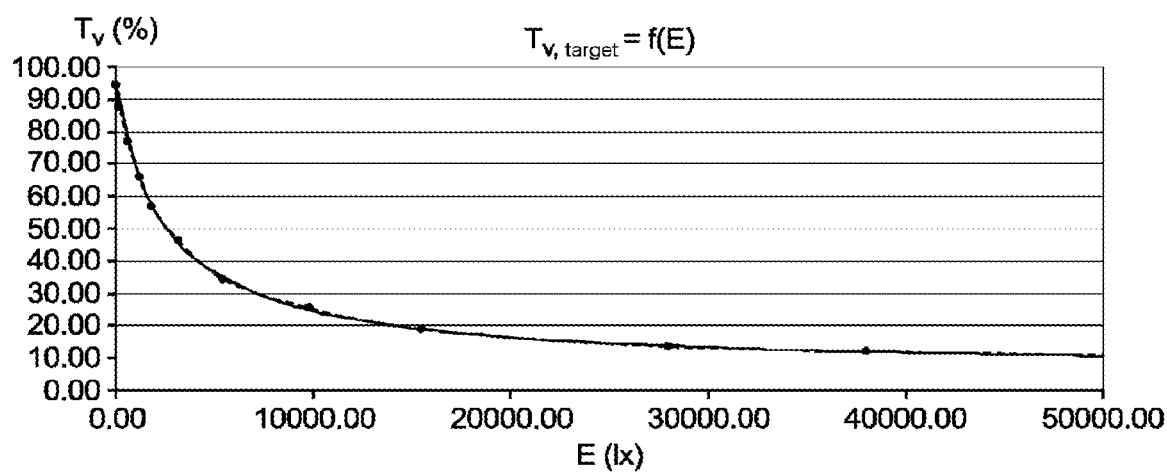
FIG. 2 is a representation of a target function Tv,target representing the transmittance of an instantaneous photochromic lens as a function of light level.

In particular, it is possible, on the basis of measurement of a photochromic lens sensitive to variations in an ultraviolet light level, to define a curve of transmittance as a function of a light level in the visible domain by extrapolation, using, for example, a reference solar spectrum, here the reference spectrum ASTM G173-03 (Global Tilt). FIG. 2 in particular shows such a target function Tv, target corresponding to an instantaneous-transition photochromic lens 7 the transmittance of which was measured using a photochromic measurement bank (PMB).

However, other target functions Tv,target may be used according to the invention. For example, the function Tv,target may be a personalized function depending on the wearer of the device 2. The function Tv,target may in particular be determined depending on preferences of the wearer in an initial phase of testing of the device 2.

According to another variant, the function Tv,target may also be modified depending on physiological data of the wearer. For example, the function Tv,target may take into account the age of the wearer, his pupil diameter, the activity of his eyelids, any ocular pathologies (start of cataracts for example, photophobias for example), or the activity of the wearer (reading, sport), without this list being limiting.

The operational plateaus P and the transmittance setpoint values Tv of the lens 4 are also chosen to take into account the luminous environment of the device 2. In particular, it is possible to define the number of operational plateaus P, the minimum and maximum values Emin, Emax of the operational plateaus P and the associated transmittance setpoint values Tv, depending on a specific light-level situation in which the wearer is liable to find himself.

Figure 3A:
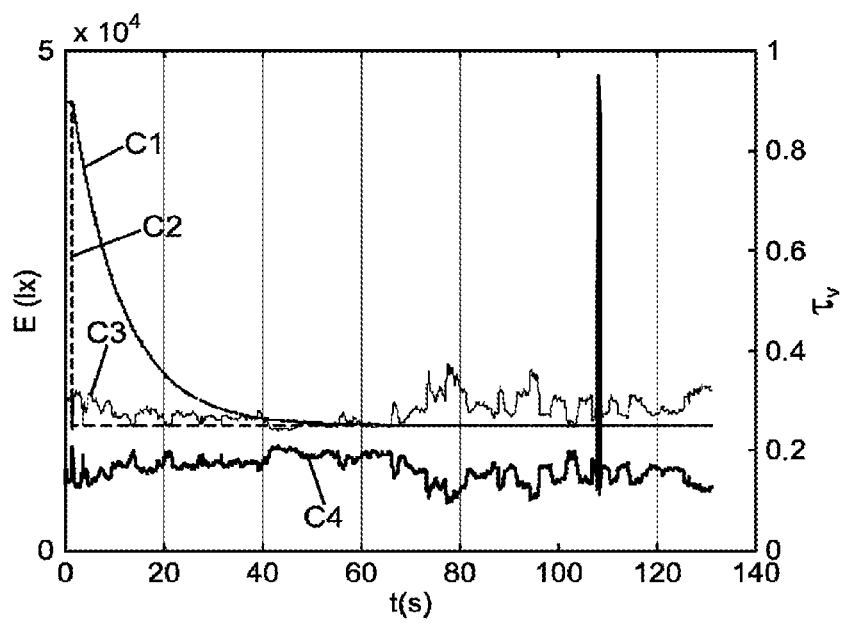
FIGS. 3A and 3B are examples of measurements of light level, as a function of time, in two different situations, the left-hand axis representing the measured light level in lux and the right-axis representing the transmittance of the lens, from 0 to 1.
Figure 3B:
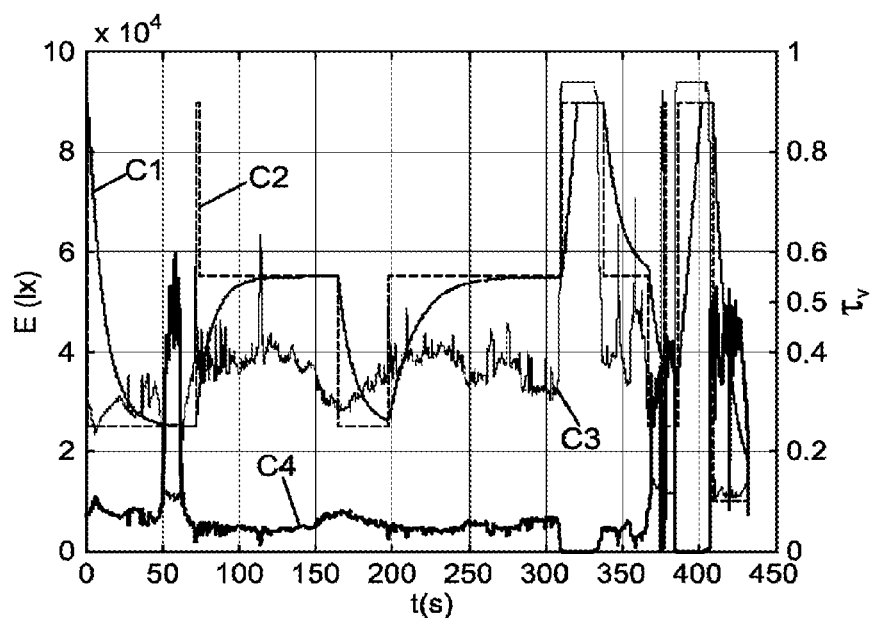

By way of example, the curves C4 of FIGS. 3A and 3B represent light-level situations corresponding to different commonplace everyday scenes measured by means of the sensor 8 placed in the nose bridge of the frame 3 as shown in FIG. 1. The system 1 is then placed vertically, i.e. the active surface of the sensor 8 is perpendicular to the ground on which the wearer finds himself.

More precisely, the curve C4 of FIG. 3A represents a fair-weather light-level measurement with the sun behind or to one side. The curve C4 of FIG. 3B represents a fair-weather light-level measurement when cloudy with sunny spells and passages through tunnels.

In these light-level situations, and in particular in those of FIGS. 3A and 3B, it is possible to optimize the values of each of the operational plateaus P, in particular the minimum value Emin, the maximum value Emax and/or the transmittance setpoint values Tv corresponding to each plateau P.

To this end, it is for example possible to define a merit function allowing these values to be determined. The merit function may depend on certain criteria, which are for example the average number of variations in the transmittance setpoint value Tv of the lens 4 in a set time.

According to one embodiment, the values of each of the operational plateaus P and their number may also depend on the state of the battery 6. For example, the control circuit 5 may define a large number of operational plateaus when the battery 6 of the device 2 is completely charged. When the battery 6 discharges, the control circuit 5 then defines a lower number of operational plateaus in order to decrease the electrical power consumption of the device 2. The control circuit 5 may then define only two operational plateaus, and therefore allow only a single transition between these two plateaus.

According to another embodiment, the merit function may also depend on the average deviation between the transmittance setpoint value Tv of the lens 4 and the target transmittance given by the target function Tv,target determined beforehand.

The criteria of the merit function may be determined in everyday light-level situations, such as those shown in FIGS. 3A and 3B.

Thus, in FIGS. 3A and 3B, the curve C4 represents the ambient light level of the device 2. The curve C3 represents the target transmittance value of the target function Tv,target. The curve C2 represents the transmittance setpoint values Tv of the lens 4 controlled by the control circuit 5 of the device 2. Lastly, the curve C1 represents the actual transmittance value of the lens 4 because of the time taken by the lens 4 to respond to the control signal of the control circuit 5. In particular, the response time of the lens 4 allows transitions in transmittance that are too abrupt to be avoided, thereby ensuring the wearer remains more comfortable visually.

According to one embodiment, the merit function in particular aims to minimize the deviation between the curve C3 and the curve C1, i.e. the deviation between the transmittance value of the target function Tv,target and the actual transmittance value of the lens 4.

Below, examples are given of minimum light-level values Emin of maximum light-level values Emax and of operational plateaus P associated with transmittance setpoint values Tv of the lens 4.

In a first example, the device 2 is located in a light-level situation corresponding to outside light-level conditions, which are liable to vary significantly. The transmittance of the lens 4 is therefore also liable to vary significantly, in particular between 0.1 and 0.9.

According to this first example, the control circuit for example defines four operational plateaus, namely:

- [Emin, Emax]=[0; 2000 lx]; the transmittance setpoint value Tv=0.9 is associated with this plateau. This corresponds to a light level measured inside and/or outside during poor weather, and the transmittance of the variable-transmittance lens is then high;
- [Emin, Emax]=[2000 lx; 6000 lx]; the transmittance setpoint value Tv=0.55 is associated with this plateau. This corresponds to a light level measured outside when the sky is overcast;
- [Emin, Emax]=[6000 lx; 20000 lx]; the transmittance setpoint value Tv=0.25 is associated with this plateau. This corresponds to a light level measured outside when it is sunny; and
- [Emin, Emax]=[20000 lx; –]; the transmittance setpoint value Tv=0.1 is associated with this plateau. This corresponding to a light level measured outside when the sky is blue and facing the sun.

According to a second example, the device 2 is located in a light-level situation corresponding to inside light-level conditions. The light level in this situation is liable to vary less strongly. It is then possible to define a restricted number of operational plateaus P and transmittance setpoint values Tv of the lens 4.

According to this second example, the control circuit 5 for example defines three operational light-level plateaus that are more closely spaced than in the first example described above, namely:

[Emin, Emax]=[0 lx; 500 lx], then Tv=0.9.
[Emin, Emax]=[500 lx; 1000 lx], then Tv=0.75.
[Emin, Emax]=[1000 lx; 2000 lx], then Tv=0.55.

According to one embodiment, each of the transmittance setpoint values Tv of the lens 4 is chosen in order to be comprised in one of the following intervals:

between 0.80 and 1 (category 0);
between 0.43 and 0.80 (category 1);
between 0.18 and 0.43 (category 2); and
between 0.08 and 0.18 (category 3).

These intervals, or categories numbered from 0 to 3, correspond to those defined in standard 8980-3 ("Optique ophtalmique—Verres de lunettes finis non détourés—Partie 3: specifications relatives au facteur de transmission et méthodes d'essai"). The transmittance setpoint values Tv of the lens 4 are advantageously comprised in different intervals, respectively.

Advantageously, in a given interval, the highest possible transmittance setpoint value Tv of the lens 4 is chosen. Specifically, setting the transmittance to a setpoint value Tv in a higher interval consumes more power than setting the transmittance to a setpoint value Tv in a lower interval. For example, a transmittance of the lens 4 in category 3 consumes about 1.5 times more electrical current than a transmittance of the lens 4 in category 2.

The method for controlling the transmittance of an lens 4 of the device 2 according to the invention is described below.

According to one embodiment, the light-level plateaus P of the sensor 8 operate according to hysteresis cycles. According to this embodiment of operation according to hysteresis cycles, the control circuit 5 defines secondary minimum and maximum values [Emin, Emax] that are different from the minimum and maximum values of the detection plateaus [Emin, Emax]hyst of the sensor 8. Below, the secondary minimum and maximum values will therefore be considered to correspond to the minimum and maximum values of an operational plateau P of the control circuit 5. The minimum value of a current plateau Emin,hyst,P0, stored by the sensor 8, is lower than or equal to the secondary minimum value Emin,P0 of this current plateau P0. The maximum value of a current plateau Emax,hyst,P0, stored by the sensor 8, is higher than or equal to the secondary maximum value Emax,P0 of this current plateau P0.

Figures 4, 5:
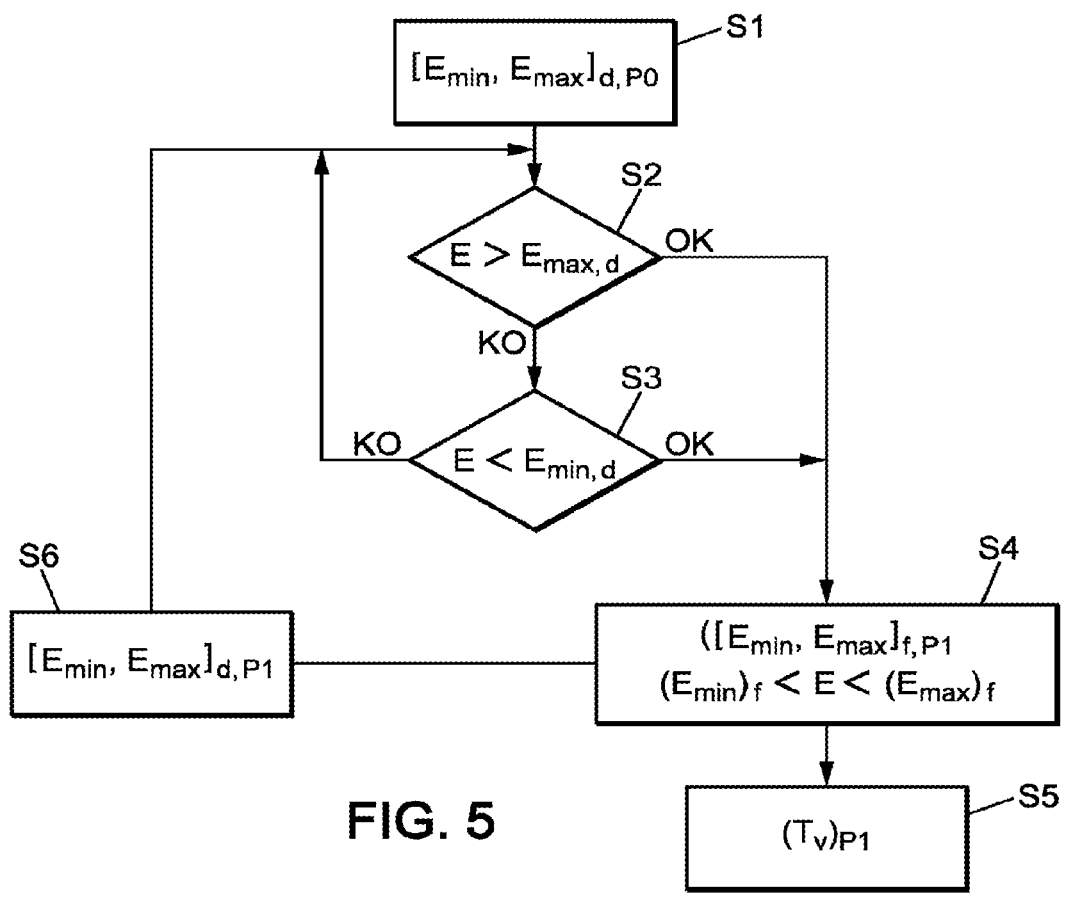
FIG. 4 is a table showing the correspondence between the plateaus of light level, in particular light level in lux, and the value of the transmittance setpoints of the lens.
FIG. 5 is a schematic representation of the steps of the method for controlling the transmittance of a variable-transmittance lens.

The second column of the table of FIG. 4 in particular indicates an example of minimum and maximum light-level values [Emin, Emax] stored by the control circuit 5 for the various operational plateaus P. The third column of the table of FIG. 4 in particular indicates an example of minimum and maximum light-level values [Emin, Emax]hyst of the sensor 8 for the various detection plateaus. Thus, each row of the table of FIG. 4 more precisely corresponds to one plateau, with which is associated one operational plateau of the control circuit 5 and one detection plateau of the sensor 8.

In a step S1, the lens 4 has an initial current transmittance setpoint value Tv,P0 corresponding to a current light-level plateau P0. The sensor 8 is initially in an inactive state, on standby. The sensor 8 stores in memory at least the minimum and maximum light-level values [Emin, Emax]hyst,P0 of the current detection plateau P0 corresponding to the current transmittance setpoint Tv,P0 of the lens 4.

As shown in FIG. 5 by the steps S2 and S3, the sensor 8 remains in the inactive state provided that the measured light level E is not higher than the maximum light-level value Emax,hyst (step S2) or lower than the minimum light-level value Emin,hyst (step S3) of the current detection plateau P0 for a length of time longer than the triggering time M.

When the sensor 8 measures a current light-level value E lower than the minimum light-level value Emin,hyst or higher than the maximum light-level value Emax,hyst of the current detection plateau P0 for a length of time longer than the triggering time Δt, the sensor 8 passes from the inactive state to the active state. The sensor 8 then transmits the current light-level value E, in particular the last measured light-level value E, to the control circuit 5.

In a step S4, after the current light-level value E measured by the sensor 8 has been received, the control circuit 5 determines a new current operational plateau P1 in which the measured light-level value E is located, in particular such that Emin,P1<E<Emax,P1. In a step S5, the control circuit 5 then automatically sets the transmittance of the lens 4 to the setpoint value Tv,P1 corresponding to the new current operational plateau P1.

In a step S6, after a new transmittance setpoint value Tv,P1 of the lens 4 corresponding to a new current plateau P1 has been applied, the control circuit 5 transmits to the sensor 8 the minimum and maximum light-level values [Emin, Emax]hyst,P1 of the new current detection plateau P1, for storage in the memory of the sensor 8.

After the minimum light-level value Emin,hyst and the maximum light-level value Emax,hyst of the new current detection plateau P1 have been received, the sensor 8 passes from the active state to the inactive state. The method for controlling transmittance is then reiterated starting with step S2.

The operation according to hysteresis cycles in particular makes it possible to avoid effects by which the lens 4 is seen to "flash", which effects are liable to appear if the transmittance setpoint values Tv of the lens 4 are changed too rapidly. In particular, such an effect arises when the light level E measured by the sensor 8 varies in the vicinity of a value corresponding to the maximum light-level value Emax,hyst,P0 of a detection plateau P0 and to the minimum value Emin,hyst,P1 of a following detection plateau P1. This may prove to be particularly bothersome for a wearer of the device 2.

However, according to another embodiment, the operation of the device 2 may also operate without hysteresis. According to this embodiment, the detection plateaus of the sensor 8 correspond to the operational plateau P of the control circuit 5. In other words, the minimum and maximum values [Emin, Emax]hyst of each detection plateau of the sensor 8 correspond to the minimum and maximum values [Emin, Emax] of each operational plateau P of the associated control circuit 5, respectively.

According to another embodiment, in order to simplify the operation of the device 2, it is possible to use only the detection plateaus [Emin, Emax]hyst of the sensor 8. According to this embodiment, the steps S1 and S3 remain identical to the method described above.

In the step S4, the control circuit 5 determines the detection plateau P1 different from P0 such that the light-level value E is higher than the minimum value Emin,hyst,P1 of the detection plateau P1, and such that the minimum value Emin,hyst,P2 of the following detection plateau is higher than the measured light-level value E. As a variant, other methods for determining the new plateau are possible in step S4. For example, the control circuit 5 determines the detection plateau P1 different from P0 such that the light-level value E is lower than the maximum value Emax,hyst, P1 of the detection plateau P1.

In the step S5, the control circuit 5 then sets the transmittance of the lens 4 to the setpoint value Tv,P1 corresponding to the new current plateau P1.

According to one embodiment such as shown in FIG. 1, the device 2 comprises an adjusting mechanism 9. The adjusting mechanism 9 is suitable for allowing a wearer of the device 2 to modify the transmittance setpoint values and/or the minimum values and/or the maximum values of the light-level plateaus P.

The adjusting mechanism 9 may be a capacitive sensor, for example placed on the side of the frame 3, in particular on one of the temples 3a, 3b.

The wearer may thus modify the parameters of the device 2 manually, for example by sliding a finger along the adjusting mechanism 9. By way of example, the wearer may change the transmittance setpoint value Tv of the lenses 4a, 4b by controlling the adjusting mechanism 9, for example by making a movement in front of or by making a long press on the adjusting mechanism 9.

According to one embodiment, the adjusting mechanism 9 may also allow the wearer to consult the state of the battery of the device 2.

According to one embodiment, the device comprises a viewing mechanism 10 visible to the wearer, for example a light-emitting diode (LED). The viewing mechanism 10 may be suitable for providing the wearer with information on his interactions with the device 2. The viewing mechanism 10 may also be suitable for providing the wearer with information on a malfunction of the device 2, in particular when the battery 6 of the device 2 is discharged or if the sensor 8 is faulty.

According to one embodiment, the device 2 comprises a transmittance sensor (not shown in the figures) allowing the transmittance value of the lens 4 to be measured in real time. It is then possible to automatically control the transmittance setpoint value Tv of the lens 4 in a closed-loop mode, and not only in an open-loop mode.

According to one embodiment, the device 2 also comprises a closure-detecting element 11 such as shown in FIG. 1. In particular, the closure-detecting element 11 is suitable for making the device 2 pass from the inactive state, i.e. on standby with a minimal electrical power consumption, when at least one of the temples 3b of frame 3 is closed. Such a closure-detecting element 11 may for example employ a magneto-resistive effect associated with a magnet to detect the opening or closure of the temple 3b.

Obviously, the invention is not limited to the embodiments described above and provided solely by way of example. It encompasses various modifications, alternative forms and other variants that a person skilled in the art will be able to envisage within the context of the present invention and in particular any combinations of the various modes of operation described above, which can be taken separately or in combination.

The invention claimed is:

1. A variable-transmittance device comprising:
   one variable-transmittance lens;
   one control circuit comprising at least one sensor configured to measure a light level (E), the control circuit being configured to automatically set a transmittance value of the variable-transmittance lens depending on the light level (E) measured by the sensor; and
   a memory, wherein:
   the control circuit is configured to define and store in the memory at least three successive light-level plateaus (P) and two threshold values, each light-level plateau (P) being bounded by a minimum light-level value (Emin) and a maximum light-level value (Emax), each threshold value being a maximum light-level value of a first light-level plateau and a minimum light-level value of a second light-level plateau of the at least three successive light-level plateaus (P),
   the control circuit is configured to set transmittance of the lens to at least three setpoint values (Tv) corresponding to the at least three successive light-level plateaus (P), respectively, based on a defined merit function using a plurality of criteria,
   the control circuit is configured to determine a state of a battery and to use the merit function to define the at least three successive light-level plateaus (P) and to set the transmittance of the lens to the at least three setpoint values (Tv) based on at least one of the plurality of criteria to decrease an electrical power consumption of the device, the at least one of the plurality of criteria comprising the state of the battery, and
   when the battery discharges, the control circuit is configured to define a lower number of light-level plateaus to decrease the electrical power consumption of the device.

2. The device as claimed in claim 1, wherein the sensor is configured to measure the light level (E) periodically, the measurement period (Tmes) of the sensor being comprised between 5 milliseconds and 1 second.

3. The device as claimed in claim 1, wherein a variation between two successive setpoint values (Tv) of the lens is comprised between 0.05 and 0.6.

4. The device as claimed in claim 1, further comprising an adjusting mechanism configured to allow a wearer of the device to modify the at least three setpoint values (Tv) and/or the minimum values (Emin) and/or the maximum values (Emax) of the at least three light-level plateaus (P).

5. The device as claimed in claim 1, wherein each of the at least three setpoint values (Tv) of the lens is comprised in one of the following intervals:
   between 0.80 and 1;
   between 0.43 and 0.80;
   between 0.18 and 0.43; and
   between 0.08 and 0.18.

6. The device as claimed in claim 1, wherein the at least three setpoint values (Tv) of the lens are comprised in different intervals, respectively.

7. An ophthalmic system comprising at least one variable-transmittance device as claimed in claim 1.

8. A method for controlling transmittance of a variable-transmittance lens of a variable-transmittance device comprising a control circuit including at least one sensor configured to measure a light level (E), the control circuit being configured to automatically set a transmittance value of the variable-transmittance lens depending on the light level (E) measured by the sensor, the method comprising:
   defining, by the control circuit, and storing in a memory at least three successive light-level plateaus (P) and two threshold values, each light-level plateau (P) being bounded by a minimum light-level value (Emin) and a maximum light-level value (Emax), each threshold value being a maximum light-level value of a first light-level plateau and a minimum light-level value of a second light-level plateau of the at least three successive light-level plateaus (P);

depending on the current light level (E) measured by the sensor, setting, by the control circuit, transmittance of the lens to one setpoint value (Tv) from at least three setpoint values (Tv) corresponding to the at least three successive light-level plateaus (P), respectively, based on a defined merit function using a plurality of criteria;

determining, by the control circuit, a state of a battery and using the merit function to define the at least three successive light-level plateaus (P) and to set the transmittance of the lens to the at least three setpoint values (Tv) based on at least one of the plurality of criteria to decrease an electrical power consumption of the device, the at least one of the plurality of criteria comprising the state of the battery; and when the battery discharges, defining, by the control circuit, a lower number of light-level plateaus to decrease the electrical power consumption of the device.

9. The method as claimed in claim 8, further comprising:
storing in the memory at least the minimum light-level value (Emin) and the maximum light-level value (Emax) of a current plateau (P0) corresponding to a current transmittance of the variable-transmittance lens; and acting, by the control circuit, on a current light-level value (E) measured by the sensor only once the sensor has measured a current light-level value (E) lower than the minimum light-level value (Emin) or higher than the maximum light-level value (Emax) of the current plateau (P0) for a length of time longer than a triggering time ($\Delta t$).

10. The method as claimed in claim 9, further comprising:
after the current light-level value (E) measured by the sensor has been received, determining, by the control circuit, a new current plateau (P1) in which the measured light-level value (E) is located; and automatically setting the transmittance of the lens to the setpoint value corresponding to the new current plateau (P1).

11. The method as claimed in claim 10, further comprising, after a new setpoint value (Tv) of the lens corresponding to a new current plateau (P1) has been applied, transmitting, by the control circuit to the sensor, the minimum light-level value (Emin,hyst) and the maximum light-level value (Emax,hyst) of the new current plateau (P1), for storage in the memory.

12. The method as claimed in claim 9, further comprising:
defining, by the control circuit, for each plateau (P), a secondary minimum value (Emin) and a secondary maximum value (Emax), the minimum value (Emin) of a current plateau (P0), stored in the memory, being lower than or equal to the secondary minimum value (Emin) of this current plateau (P0), and the maximum value (Emin) of a current plateau (P0), stored in the memory, being higher than or equal to the secondary maximum value (Emax) of the current plateau (P0);

after the current light-level value (E) measured by the sensor has been received, determining, by the control circuit, a new current plateau (P1) in which the measured light-level value (E) is comprised between the secondary minimum value (Emin) and the secondary maximum value (Emax) of the new current plateau (P1); and automatically setting the transmittance of the lens to the setpoint value (Tv) corresponding to the new current plateau (P1).

13. The method as claimed in claim 9, wherein the triggering time ($\Delta t$) of the sensor is comprised between 1 second and 2 seconds.

14. The method as claimed in claim 8, further comprising obtaining the light level-dependent setpoint values (Tv) of the lens via transmittance values of a photochromic lens.

15. A non-transitory computer readable storage medium, with a program stored thereon, said program comprising instructions for implementing the method of claim 8.

* * * * *